(12) United States Patent
Chang et al.

(10) Patent No.: US 7,639,939 B2
(45) Date of Patent: Dec. 29, 2009

(54) LENS MODULE WITH AN ADJUSTABLE LENS UNIT

(75) Inventors: Ku-Yuan Chang, Taichung (TW); Po-Yu Chen, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 370 days.

(21) Appl. No.: 11/788,618

(22) Filed: Apr. 19, 2007

(65) Prior Publication Data

US 2007/0286591 A1    Dec. 13, 2007

(30) Foreign Application Priority Data

Jun. 12, 2006    (TW) .............................. 95120827 A

(51) Int. Cl.
     *G03B 17/00*    (2006.01)
     *G02B 7/04*    (2006.01)

(52) U.S. Cl. ........................................ 396/144; 396/75

(58) Field of Classification Search ................. 396/144, 396/75, 87

See application file for complete search history.

(56) References Cited

U.S. PATENT DOCUMENTS

2006/0209192 A1*    9/2006    Shinohara et al. ...... 348/207.99

FOREIGN PATENT DOCUMENTS

JP      2005-215539      8/2005

* cited by examiner

*Primary Examiner*—Rodney E Fuller
(74) *Attorney, Agent, or Firm*—Ladas & Parry LLP

(57) ABSTRACT

A lens module includes a base, a drive unit, a speed reduction unit, an outer barrel, and a lens unit. The speed reduction unit is coupled to and driven rotatably by the drive unit. The outer barrel is mounted to the base and has a barrel wall that surrounds an axis, that defines a receiving space, and that has an inner wall surface formed with an internally threaded portion. The lens unit includes a lens barrel that defines a chamber, and at least one lens disposed in the lens barrel. The lens barrel has an externally threaded portion that extends into the outer barrel to engage threadedly with the internally threaded portion of the barrel wall, and a driven portion driven rotatably by the speed reduction unit.

9 Claims, 8 Drawing Sheets

LENS MODULE WITH AN ADJUSTABLE LENS UNIT

CROSS-REFERENCE TO RELATED APPLICATION

This application claims priority of Taiwanese Application No. 095120827, filed on Jun. 12, 2006.

BACKGROUND OF THE INVENTION

1. Field of the Invention

The invention relates to a lens module, more particularly to a lens module with an adjustable lens unit.

2. Description of the Related Art

As shown in FIGS. 1 and 2, Japanese Laid-Open Publication No. 2005-215539 discloses an adjustable lens module for a camera phone. The lens module includes a base 11, an outer covering 12, a driving motor 13, a speed reduction gear system 14 including a plurality of speed reduction gears that are driven rotatably by the driving motor 13, a barrel cam 15 mounted to the base 11 and driven by the speed reduction gear system 14, a first lens unit 16, a second lens unit 17 disposed parallel to the first lens unit 16, and a tension spring (not visible) disposed between the first and second lens units 16 and 17.

The barrel cam 15 includes a cylinder 151 and a spiral portion 152 formed on the surface of the cylinder 151. The spiral portion 152 has an upper spiral surface 153 and a lower spiral surface 154.

The first lens unit 16 includes a first lens frame 161 movably mounted to the base 11, a first lens 162 disposed in the first lens frame 161, and a first cam follower 163 abutting against the upper spiral surface 153 of the barrel cam 15. The second lens unit 17 includes a second lens frame 171 movably mounted to the base 11, a second lens 172 disposed in the second lens frame 171, and a second cam follower 173 abutting against the lower spiral surface 154 of the barrel cam 15. Therefore, the spiral portion 152 of the barrel cam 15 is pressed on both sides by the first and second cam followers 163 and 173.

When the barrel cam 15 rotates about an axis thereof, the first and second cam followers 163 and 173 will slide along the upper and lower spiral surfaces 153 and 154, respectively, and the first and second lens frames 161 and 171 will move toward or away from each other accordingly, thereby resulting in corresponding relative movement between the first and second lenses 162 and 172.

When the driving motor 13 rotates clockwise or counterclockwise, the speed reduction gear system 14 will be driven to rotate simultaneously. Meanwhile, the barrel cam 15 will also be driven to rotate by the speed reduction gear system 14, such that the first and second lenses 162 and 172 are driven to move relative to each other for focus adjustment.

However, the speed reduction gear system 14 has to drive the first and second lens frames 161 and 171 by driving the barrel cam 15 first, rather than driving them directly. Therefore, the number of components and the size of the lens module are difficult to be reduced effectively, which leads to a more complicated assembly process and a higher manufacturing cost.

SUMMARY OF THE INVENTION

Therefore, the object of the present invention is to provide a lens module with an adjustable lens unit for focus adjustment, whose components are fewer, size is smaller and manufacturing costs are lower as compared to the prior art.

Accordingly, a lens module with an adjustable lens unit of the present invention comprises a base, a drive unit mounted to the base, a speed reduction unit coupled to and driven rotatably by the drive unit, an outer barrel mounted to the base and having a barrel wall that surrounds an axis, that defines a receiving space, and that has an inner wall surface formed with an internally threaded portion, and a lens unit including a lens barrel that defines a chamber, and at least one lens disposed in the lens barrel. The lens barrel has an externally threaded portion that extends into the outer barrel to engage threadedly with the internally threaded portion of the barrel wall, and a driven portion driven rotatably by the speed reduction unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
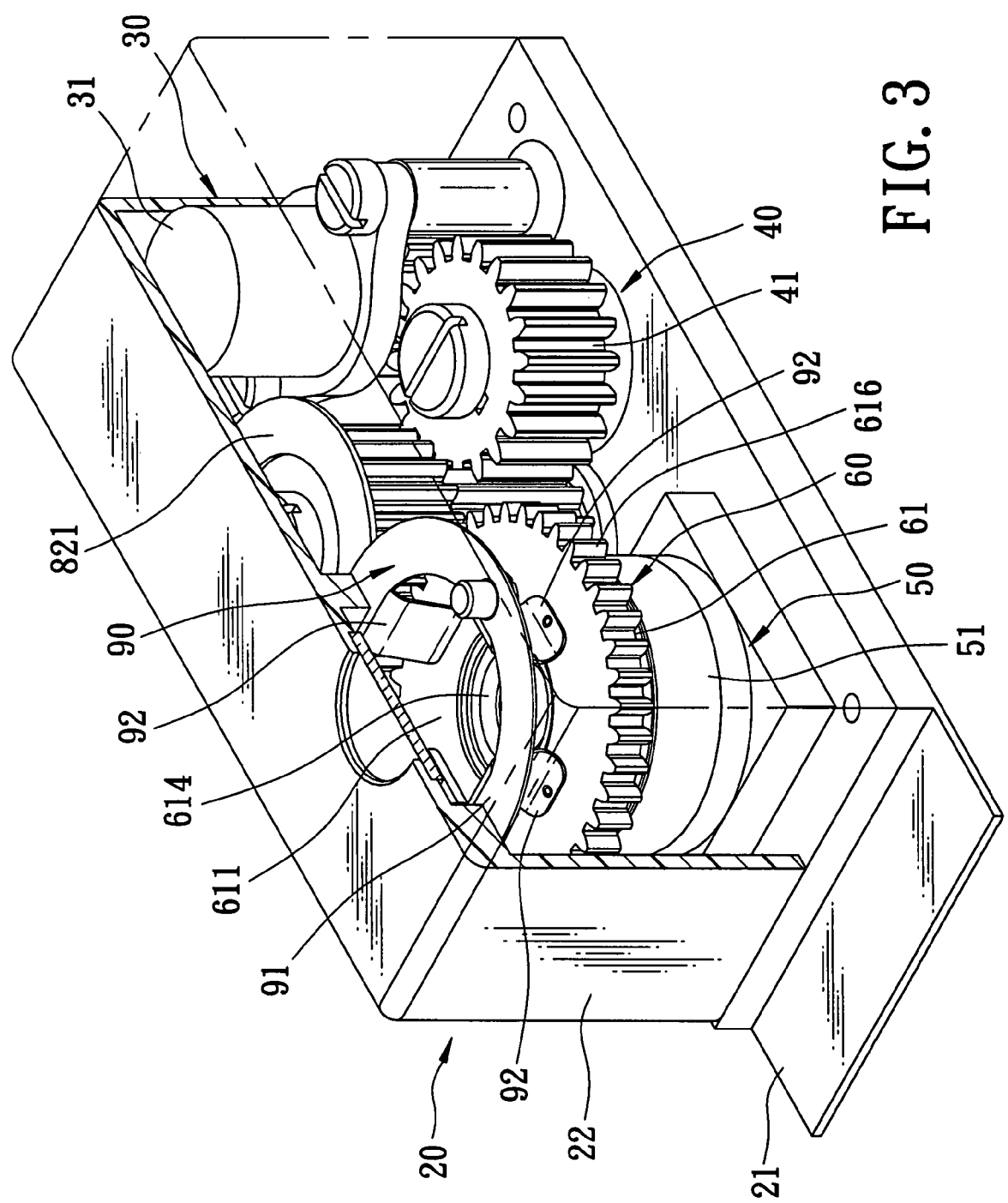
FIG. 3 is a perspective partly cutaway view of the preferred embodiment of a lens module with an adjustable lens unit according to the invention.
Figure 4:
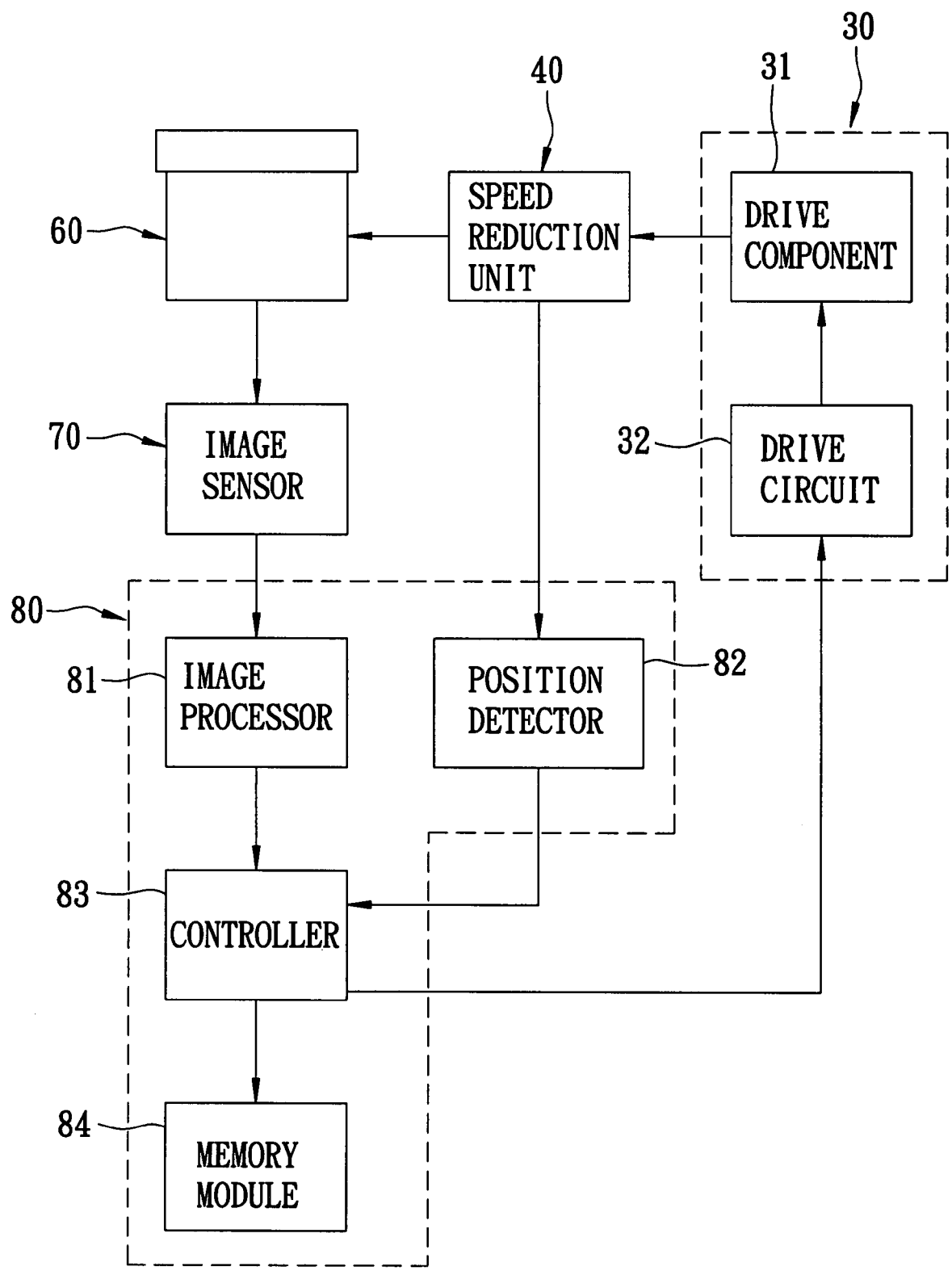
FIG. 4 is a block diagram of the preferred embodiment.
Figure 6:
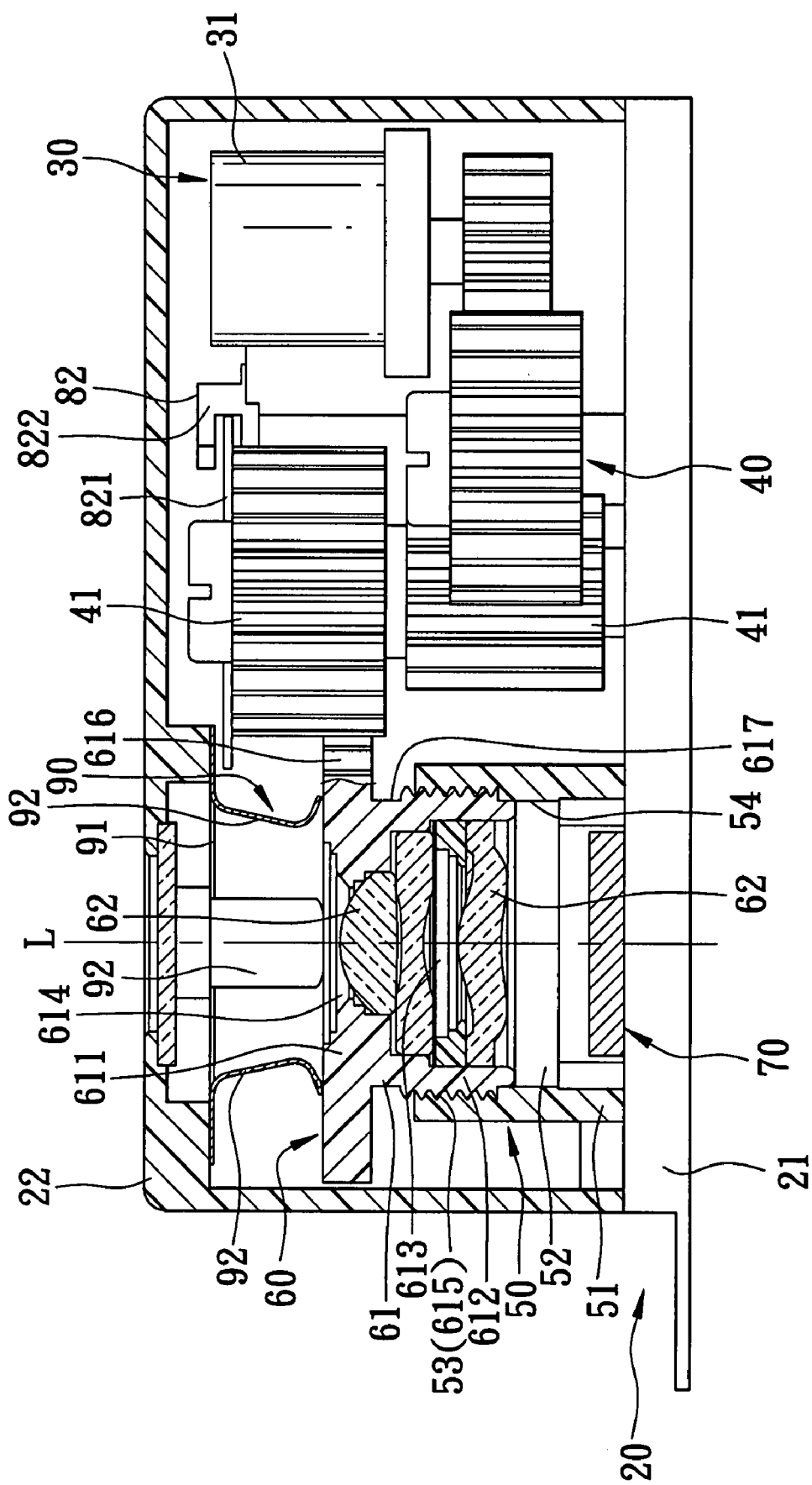
FIG. 6 is a sectional view of the preferred embodiment illustrating a relative position of an outer barrel and a lens barrel before focus adjustment.

As shown in FIGS. 3, 4 and 6, the preferred embodiment of a lens module with an adjustable lens unit of this invention includes a base 20, a drive unit 30, a speed reduction unit 40, an outer barrel 50, a lens unit 60, an image sensor 70, a control device 80, and a backlash compensating unit 90. The lens module is suitable for application to a camera phone.

The base 20 includes a bottom seat 21 having the drive unit 30, the speed reduction unit 40 and the outer barrel 50 mounted thereon, and a cover member 22 capped on the bottom seat 21.

The drive unit 30 is mounted to the bottom seat 21 and includes a drive component 31 and a drive circuit 32 for controlling driving operation of the drive component 31. In this preferred embodiment, the drive component 31 is a stepping motor.

The speed reduction unit 40 is mounted to the bottom seat 21, is coupled to and driven rotatably by the drive component 31, and includes a speed reduction gear system formed from a plurality of speed reduction gears 41.

The outer barrel 50 is mounted to the bottom seat 21 and has a barrel wall 51 that surrounds an axis (L), that defines a receiving space 52, and that has an inner wall surface 54 formed with an internally threaded portion 53.

The lens unit 60 includes a lens barrel 61 that defines a chamber 613, and three lenses 62 disposed in the lens barrel 61. The lens barrel 61 has an end wall 611 that extends in radial outward directions relative to the axis (L), a surrounding wall 612 that is connected to the end wall 611 and that extends parallel to the axis (L), an externally threaded portion 615 that extends into the outer barrel 50 to engage threadedly with the internally threaded portion 53 of the barrel wall 51, and a driven portion 616 that is in a form of a gear and driven rotatably by the speed reduction unit 40.

The lens barrel 61 further has an opening 614 in spatial communication with the chamber 613, and the lenses 62 of the lens unit 60 are disposed to correspond in position to the opening 614 in the lens barrel 61. The end wall 611 has an outer periphery formed with the driven portion 616. The surrounding wall 612 has an outer wall surface 617 formed with the externally threaded portion 615.

The image sensor 70 is mounted to the bottom seat 21, and is disposed in the receiving space 52 of the outer barrel 50 and corresponding in position to the lenses 62 of the lens unit 60. The image sensor 70 senses images via the opening 614 and the lenses 62, and then converts the images into image signals for subsequent processing.

The control device 80 includes an image processor 81 connected electrically to the image sensor 70, a position detector 82 connected to the speed reduction unit 40, a controller 83, and a memory module 84 for data storage. The controller 83 is connected electrically to the image processor 81, the position detector 82, the memory module 84, and the drive circuit 32 of the drive unit 30.

Figure 5:
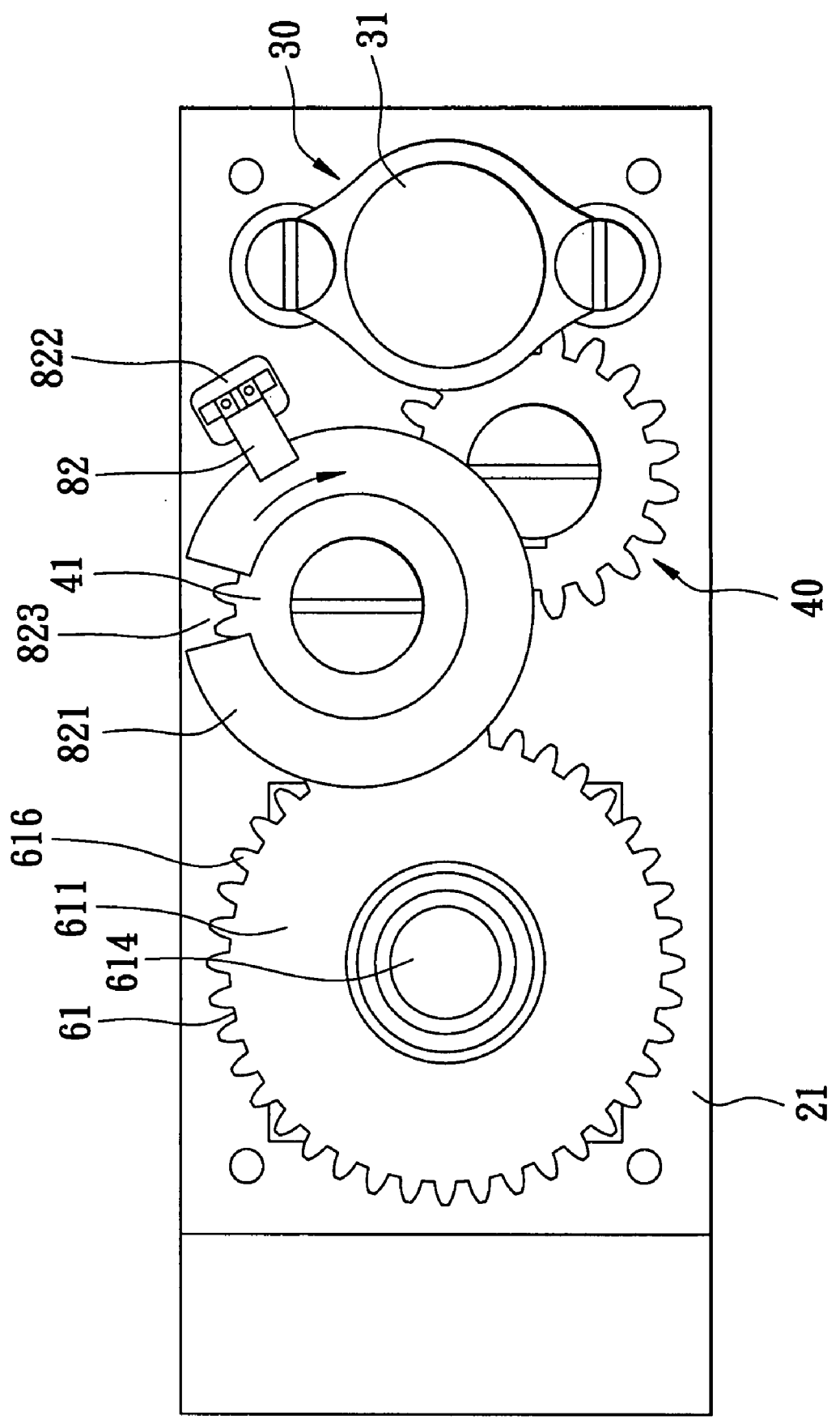
FIG. 5 is a schematic top view of the preferred embodiment illustrating a notch of a rotary blade of a position detector before focus adjustment.

As shown in FIGS. 4, 5 and 6, the position detector 82 includes a rotary blade 821 mounted co-rotatably to the speed reduction unit 40, and a position sensor 822 connected electrically to the controller 83 to detect rotation of the rotary blade 821. The rotary blade 821 is formed with a notch 823, and the position of the notch 823 relative to the position sensor 822 varies as the rotary blade 821 rotates. When the drive component 31 rotates, the rotary blade 821 is driven to rotate with the speed reduction unit 40. Once the notch 823 moves to be registered with the position sensor 822, the position sensor 822 will output a zero position signal to the controller 83 as an indication of the relative position between the lens unit 60 and the outer barrel 50. The controller 83 uses the zero position signal as a reference for controlling the rotation of the drive unit 30.

The backlash compensating unit 90 includes an annular plate 91 fixed to the cover member 22, and four compression spring plates 92 connected to the annular plate 91, angularly spaced apart from each other, and abutting against the end wall 611 of the lens barrel 61. According to the preferred embodiment, the backlash is an interstice that results from the engagement between the externally threaded portion 615 of the lens barrel 61 and the internally threaded portion 53 of the outer barrel 50.

Figure 7:
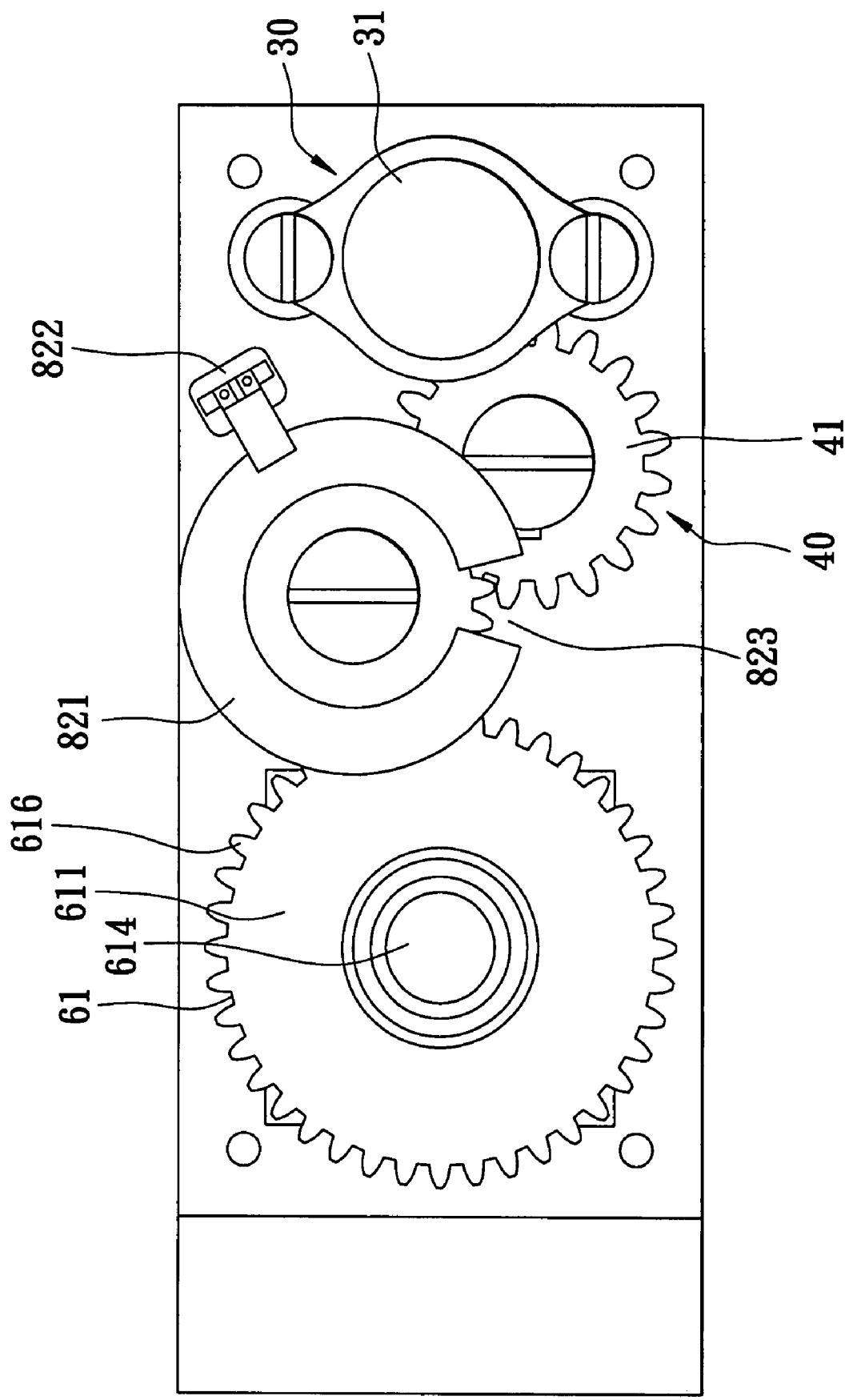
FIG. 7 is a view similar to FIG. 5 but illustrating the preferred embodiment after focus adjustment.
Figure 8:
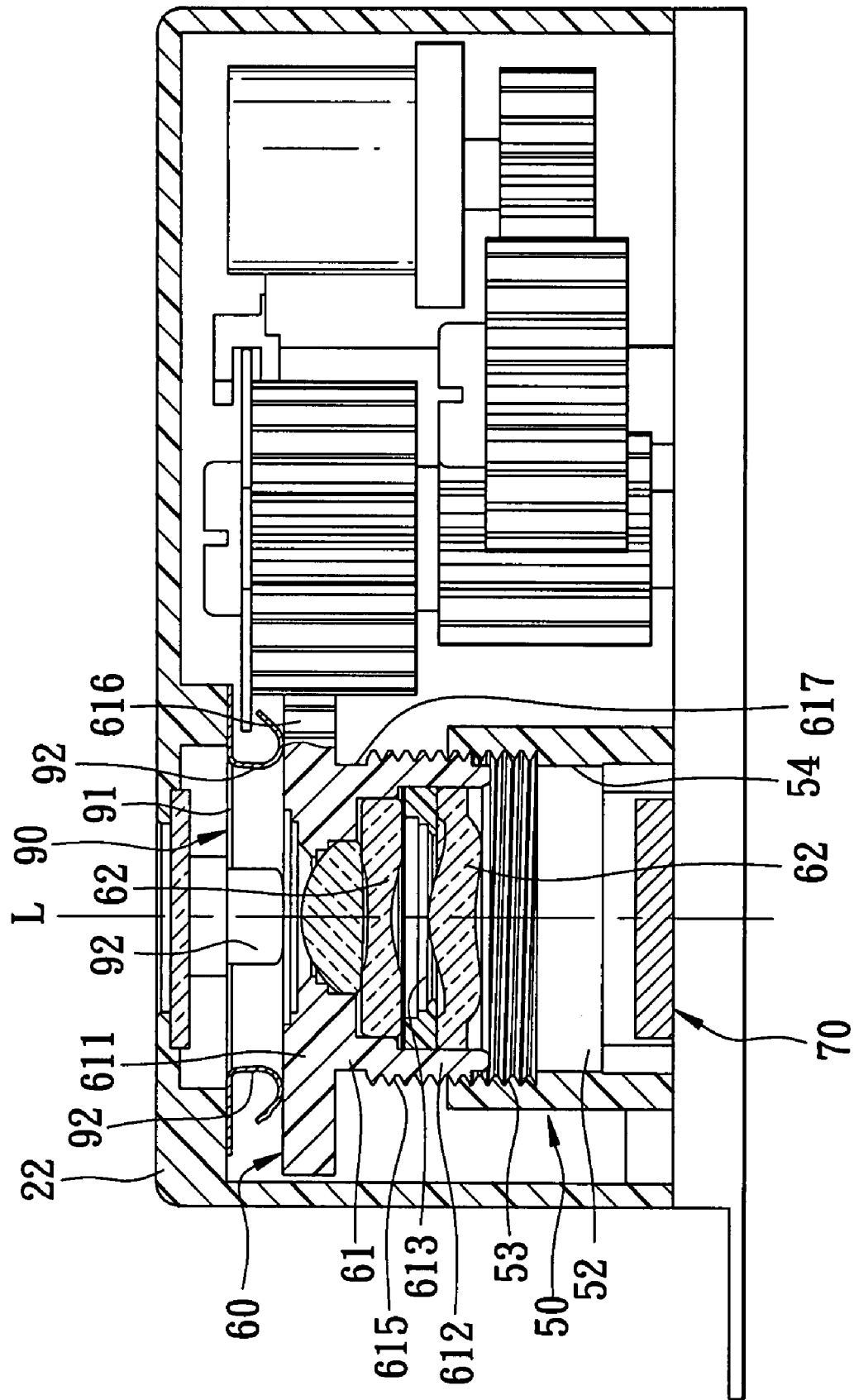
FIG. 8 is a view similar to FIG. 6 but illustrating the preferred embodiment after focus adjustment.

As shown in FIGS. 7 and 8 compared to FIGS. 5 and 6, respectively, when a user is taking pictures with a camera phone that incorporates the preferred embodiment, the lens barrel 61 will move threadedly along the axis (L) for focus adjustment through an automatic focusing process.

The automatic focusing process is described as follows: First, the controller 83 outputs a control command to the drive circuit 32, and the drive circuit 32 outputs a control signal to the drive component 31 to result in rotation of the drive component 31. The rotation of the drive component 31 then results in the rotation of the speed reduction gears 41 of the speed reduction unit 40. Since the driven portion 616 of the lens barrel 61 is in a form of a gear that is engaged with the speed reduction unit 40, the driven portion 616 is driven to rotate by the speed reduction gears 41, such that the lens barrel 61 is driven to rotate about the axis (L). Since the lens barrel 61 is coupled threadedly to the outer barrel 50, the lens barrel 61 is able to move along the axis (L). The lenses 62 disposed in the lens barrel 61 also move with the lens barrel 61, such that the distance between the lenses 62 and the image sensor 70 changes accordingly.

While the lenses 62 move close to or away from the image sensor 70, the image sensor 70 generates a plurality of image signals continuously. These image signals are transformed into a plurality of evaluation values through the image processor 81 and saved in the controller 83. Since the transformation of the image signals to evaluation values is computed through the Modulation Transfer Function (MTF), the evaluation values are also generally known as MTF values. A higher MTF value means a larger black/white image contrast, i.e., a clearer image.

When the lenses 62 are driven through rotation of the drive component 31 and move relative to the image sensor 70, the controller 83 also keeps comparing the MTF values computed by the image processor 81 to find the highest one. The position of the lenses 62 corresponding to the highest MTF value is then set as a focus position.

Each of the spring plates 92 of the backlash compensating unit 90 has one end abutting constantly against the end wall 611 of the lens barrel 61. The spring plates 92 urge the lens barrel 60 toward the outer barrel 50, so that the internally and externally threaded portion 53 and 615 will engage with each other firmly, thereby compensating the effect of backlash.

Figure 1:
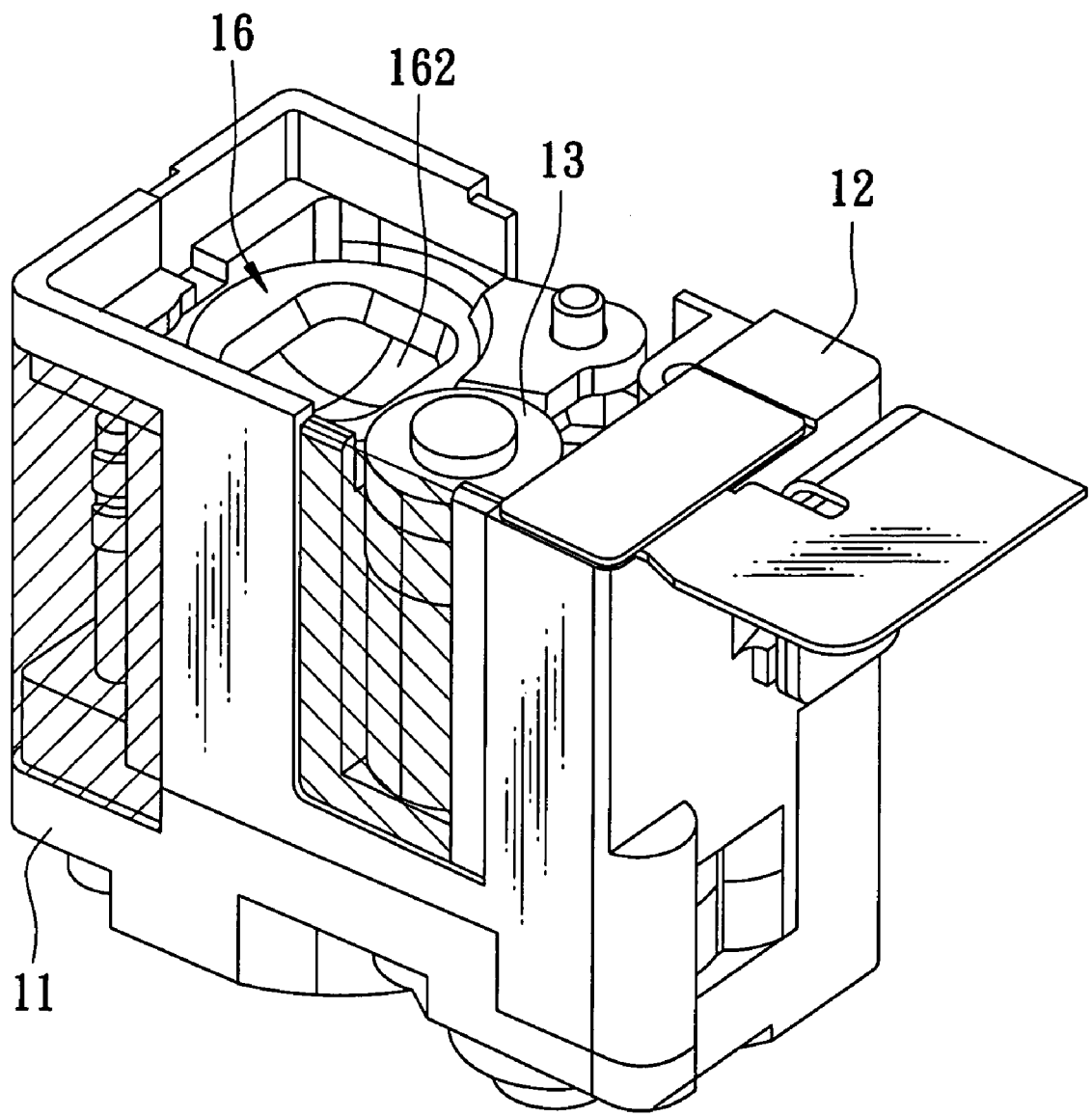
FIG. 1 is an assembled perspective view of a conventional adjustable lens module disclosed in Japanese Laid-Open Publication No. 2005-215539.
Figure 2:
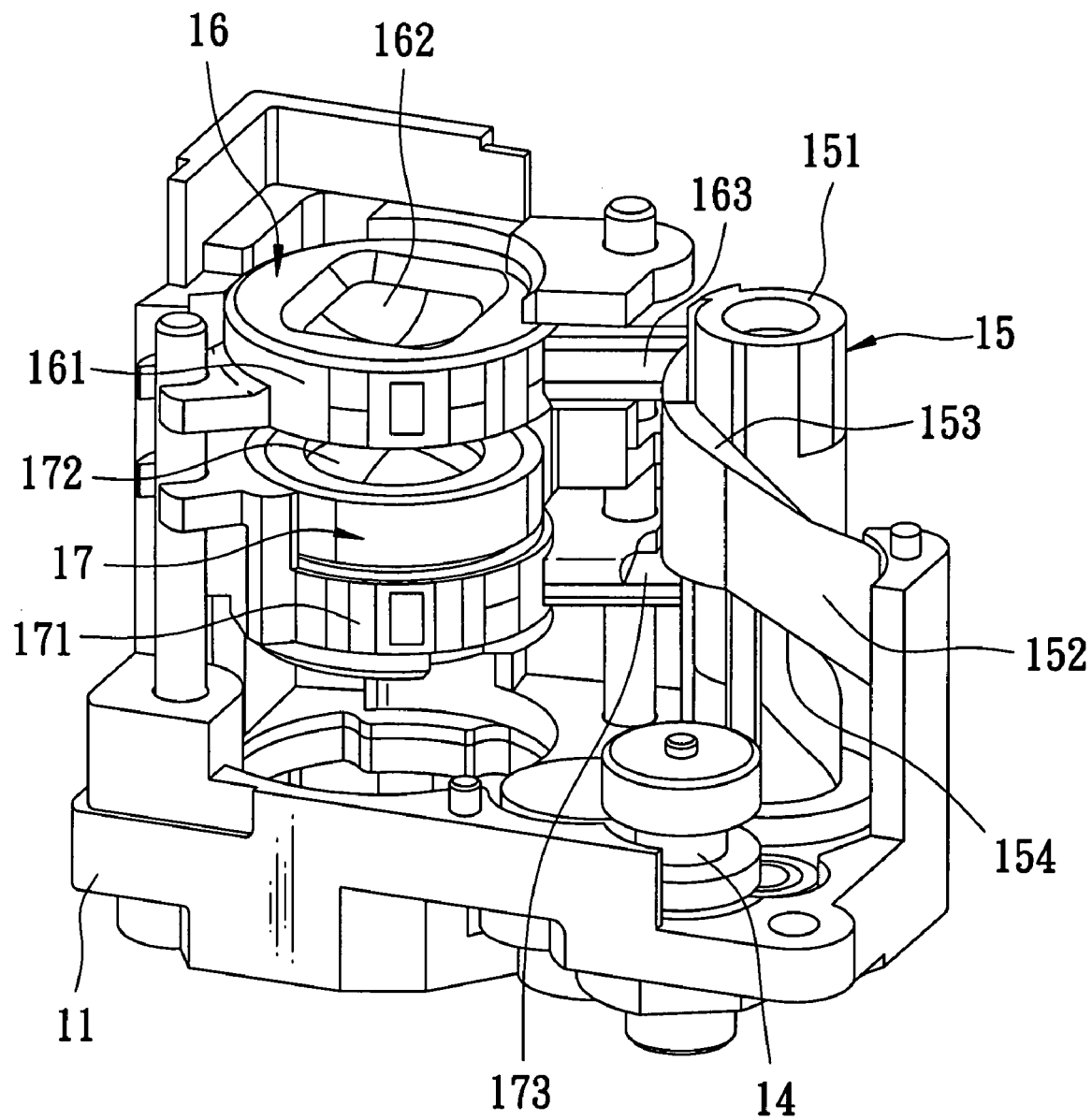
FIG. 2 is an assembled perspective view of the prior art illustrating a speed reduction gear system, a barrel cam, and first and second lens units thereof.

Therefore, according to the lens module of the present invention, the driven portion 616 that is driven by the speed reduction gears 41 drives the lens barrel 61 that is connected threadedly to the outer barrel 50 to move, and the lenses 62 disposed in the lens barrel 61 also move synchronously close to or away from the image sensor 70 for focus adjustment. Compared to the prior art (as shown in FIG. 2), where the barrel cam 15 is needed for the speed reduction gear system 14 to drive movement of the first and second lenses 162 and 172 for focus adjustment, the barrel cam is omitted in the present invention, so that the number of components and the size of the lens module are reduced. In another aspect, with the reduced components of the lens module, the manufacturing costs are also reduced to make the product more competitive on the market.

It should be noted that, while this invention is exemplified using three lenses 62 and four spring plates 92, any number of a plurality of lenses and spring plates may be employed in other embodiments of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lens module comprising:
   a base;
   a drive unit mounted to said base;
   a speed reduction unit mounted to said base and driven rotatably by said drive unit;
   an outer barrel mounted to said base and having a barrel wall that surrounds an axis, that defines a receiving space, and that has an inner wall surface formed with an internally threaded portion; and a lens unit including a lens barrel that defines a chamber, and at least one lens disposed in said lens barrel, said lens barrel having an externally threaded portion that extends into said outer barrel to engage threadedly with said internally threaded portion of said barrel wall, and a driven portion driven rotatably by said speed reduction unit;

wherein said speed reduction unit includes a speed reduction gear system, and said lens barrel has an end wall that extends in radial outward directions relative to the axis, and a surrounding wall that is connected to said end wall and that extends parallel to the axis, said end wall having an outer periphery formed with said driven portion that is in a form of a gear, said surrounding wall having an outer wall surface formed with said externally threaded portion.

2. The lens module as claimed in claim 1, further comprising an image sensor disposed in said receiving space of said outer barrel and corresponding in position to said lens of said lens unit.

3. The lens module as claimed in claim 2, wherein said drive unit includes a stepping motor and a drive circuit for controlling driving operation of said stepping motor.

4. The lens module as claimed in claim 3, further comprising a control device including an image processor connected electrically to said image sensor, a position detector connected to said speed reduction unit, and a controller connected electrically to said image processor, said position detector and said drive circuit of said drive unit.

5. The lens module as claimed in claim 4, wherein said position detector includes a rotary blade mounted co-rotatably to said speed reduction unit, and a position sensor connected electrically to said controller and operable to detect rotation of said rotary blade.

6. The lens module as claimed in claim 1, wherein said speed reduction unit includes a speed reduction gear system, and said driven portion of said lens barrel is in a form of a gear.

7. The lens module as claimed in claim 1, wherein said lens barrel of said lens unit has an opening, and said lens unit includes a plurality of said lenses disposed to correspond in position to said opening in said lens barrel.

8. The lens module as claimed in claim 1, wherein said base includes a bottom seat having said drive unit, said speed reduction unit and said outer barrel mounted thereon, said base further including a cover member capped on said bottom seat.

9. The lens module as claimed in claim 8, further comprising a backlash compensating unit including an annular plate fixed to said cover member, and a plurality of compression spring plates connected to said annular plate, angularly spaced apart from each other, and abutting against said lens barrel of said lens unit.

* * * * *